United States Patent [19]

Stoll et al.

[11] Patent Number: 5,228,380
[45] Date of Patent: Jul. 20, 1993

[54] LINEAR DRIVE

[75] Inventors: Kurt Stoll, Esslingen; Eugen Schlötzer, Schwabach; Herbert Köngeter, Reichenbach, all of Fed. Rep. of Germany

[73] Assignee: Festo KG, Esslingen, Fed. Rep. of Germany

[21] Appl. No.: 936,498

[22] Filed: Aug. 28, 1992

[30] Foreign Application Priority Data

Oct. 15, 1991 [DE] Fed. Rep. of Germany ....... 4134063

[51] Int. Cl.⁵ .............................................. F01B 11/02
[52] U.S. Cl. ..................... 92/85 B; 92/13.6; 92/13.8; 91/25; 91/27
[58] Field of Search ............ 92/13.6, 13.8, 85 R, 92/85 A, 85 B; 91/25, 26, 27

[56] References Cited

U.S. PATENT DOCUMENTS

| 2,718,842 | 9/1955 | Klemm | 92/13.8 |
| 3,152,095 | 11/1964 | Heiser | 91/26 |
| 3,255,675 | 6/1966 | Reeve et al. | 92/85 R |
| 3,605,553 | 9/1971 | Panigai | 92/85 B |
| 3,805,672 | 4/1974 | Pekrul | 91/26 |

FOREIGN PATENT DOCUMENTS

| 1057894 | 12/1950 | France | 91/25 |
| 0706578 | 12/1979 | U.S.S.R. | 92/85 B |
| 1435858 | 11/1988 | U.S.S.R. | 92/85 B |
| 1401126 | 7/1975 | United Kingdom | 92/85 R |

Primary Examiner—Thomas E. Denion
Attorney, Agent, or Firm—Browdy and Neimark

[57] ABSTRACT

A linear drive comprising a drive member adapted to be reciprocated axially in a housing between two end positions. Opposite to the former there is a wall on at least one axial side. There are means to reduce the impact in the end position, such means having an annular lip. The lip is arranged on the drive member or on the wall and respectively faces the wall or the housing. The lip defines a damping space which is open on an impact side. If the drive member approaches one end position thereof, the damping space is occluded and reduced in volume so that some trapped fluid will escape via a relief opening so that there is a braked part of the stroke. Using simple means it is therefore possible to provide an extremely efficient fluid damping at the end position.

20 Claims, 2 Drawing Sheets

LINEAR DRIVE

BACKGROUND OF THE INVENTION

The present invention relates to a linear drive comprising a drive member adapted to be reciprocated axially in a housing between two end positions and opposite to which at least one axial side a wall is arranged which is connected with the housing, and means to reduce the impact in the end position, such means having an impact member arranged on the drive member, as a first component, or on the wall, as a second component, and facing the respective other one of such first and second components.

Such a linear drive, which is in the form of a piston and cylinder unit, is disclosed in the U.S. Pat. No. 4,207,807. In this case the drive member is constituted by a piston which is reciprocated by fluid power and in its end positions it strikes a wall of the housing with an impact. In order to reduce the intensity of the impact a washer-like impact member is arranged on the piston or on the opposite housing wall in order to function as a buffer.

Although the drive member and the housing walls of this arrangement are protected against damage directly due to the impacts, the elasticity of the impact member leads to rebound at the end of the stroke so that the drive member does not immediately assume its final or ultimate end position. If an attempt is made to reduce rebound by increasing the pressure acting on the drive member, then when the action of the pressure ceases there is a small return movement of the member, which is just as undesirable and which is due to the elastic deformation of the impact member. In no case is it therefore possible to provide for an even braking or retarding of the drive member at the end of the stroke.

SHORT SUMMARY OF THE INVENTION

One object of the present invention is to provide a linear drive of the type initially mentioned which allows a reduction of the intensity of impact in the end position.

A further object of the invention is to achieve this using simple means and while guaranteeing an even retardation or braking of the drive member.

In order to achieve these and/or other objects appearing from the present specification, claims and drawings, in the present invention the impact member is constituted by an annular elastically flexing lip projecting from the component, which supports the impact member towards the opposite component, such lip defining a damping space, which on the impact side is open via the annular opening towards the opposite component and on approaching the associated end position is able to be occluded so as to trap a volume of fluid, on approaching such end position the annular lip is able to be bent inwards from the component occluding its annular opening with a reduction of the volume of the damping space, along its entire periphery, and furthermore at least in the occluded condition of the annular opening the damping space is in communication with an escape opening, which when there is a reduction of the volume of the damping space allows for a choked escape of trapped fluid.

In this arrangement there is therefore a fluid damping action when the end position is approached and such action retards the drive member in the last section of the movement without any rebound elasticity within a short displacement. If for instance the annular lip is arranged on the drive member, then the annular opening surrounded by it will initially be occluded, when one end position is approached, by a wall integral with a housing. When this happens, a volume of fluid is trapped within the damping space included by the annular lip, such fluid preferably being air. At the point in time of occluding the retarded or braked section of the movement of the drive member commences, in the course of which the annular lip is bent inwards with an accompanying reduction in the volume of the damping space, this meaning that there is a compression of the trapped volume of fluid and that fluid flows out of the damping space via the escape opening with a choking action. A regulation of the resulting damping effect is possible by varying the intensity of the choking action. When the end position is reached so much fluid will have emerged from the damping space that even if the initial velocity was very high there is no rebound. It is an advantage furthermore that after discontinuance of the displacing force acting on the drive member there is not the even the least rebound movement so that on reaching the end position in all cases a stable or steady-state position of the drive member is attained. The choked emergence of the fluid furthermore prevents the establishment of an increasing opposite force so that the linear drive may be effectively operated. The means for producing this advantageous effect are extremely simple, are cheap to produce and extremely compact so that as compared with a conventional linear drive there is practically no increase in the overall length despite the efficient damping action.

Advantageous further developments of the invention are described in the claims.

It is preferred for the annular lip to be part of a skirted or cuff-like elastic member, it being for instance constituted by a surrounding collar on the same.

In the event of a radial sealing action being necessary between the drive member and the inner surface of the housing surrounding same, it is possible for a corresponding sealing lip to be formed integrally with the annular lip responsible for the damping action. In this case a single component is utilized to produce a dual effect cheaply. It is more particularly in such a case that the cuff-like configuration proves suitable for the impact member.

The escape opening allowing the emergence of the fluid is preferably directly formed in the impact member and in this respect is conveniently in the form of an interruption in the annular lip. It may be in the form of a small, narrow duct, which connects the closed damping space with the housing space arranged between the drive member and the associated wall.

It is an advantage more particularly for the damping action produced to be utilized for a linear drive in the form of a piston and cylinder unit, in the case of which with the drive member is constituted by a fluid power, or more particularly pneumatic piston.

The use of a linear drive frequently entails a smaller stroke of the drive part than is inherently allowed for by design parameters. In these cases it is possible for the piston movement to be detected at the desired position, for instance by means of proximity switches in the form of a reed switch or the like, or by other sensors and for such movement to be reversed. However to ensure that the desired damping action still commences at the respective end of the stroke it is an advantage if the drive member comprises two drive elements which are able to be axially adjusted in relation to each other and are able to be set at different axial distances from each other. Alternatively or additionally it is possible furthermore for at least one wall integral with the housing to be able to be set at different axial positions.

The invention will now be described in following with reference to the accompanying drawings.

LIST OF THE SEVERAL VIEWS OF THE FIGURES

DETAILED ACCOUNT OF WORKING EMBODIMENTS OF THE INVENTION

Figure 1:
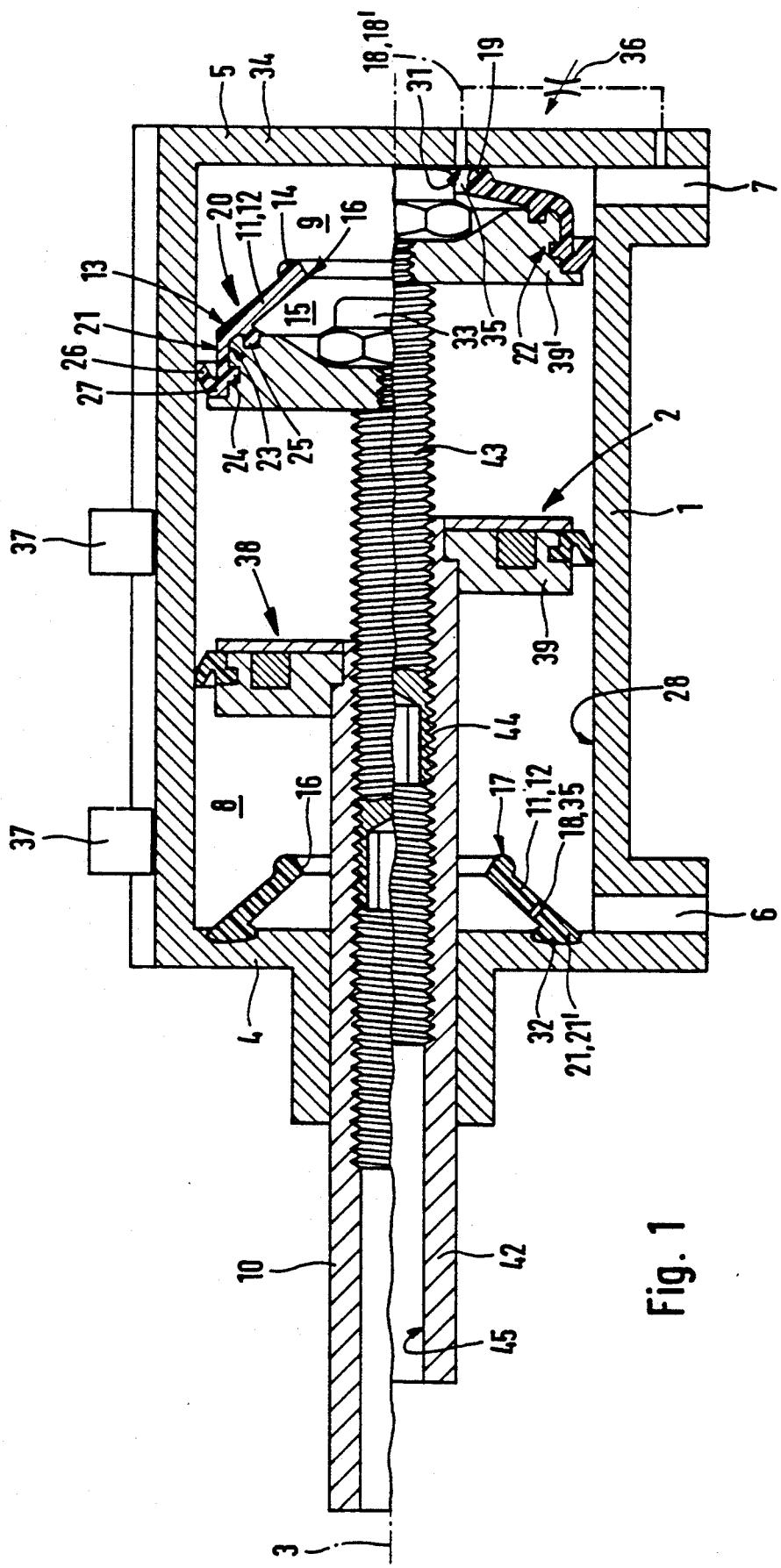
FIG. 1 shows a first working embodiment of the linear drive in accordance with the invention in a diagrammatic longitudinal cross section, the upper part of the figure indicating an idle position of the impact member arranged on the drive member and the lower part indicating an active position of the same.
Figure 2:
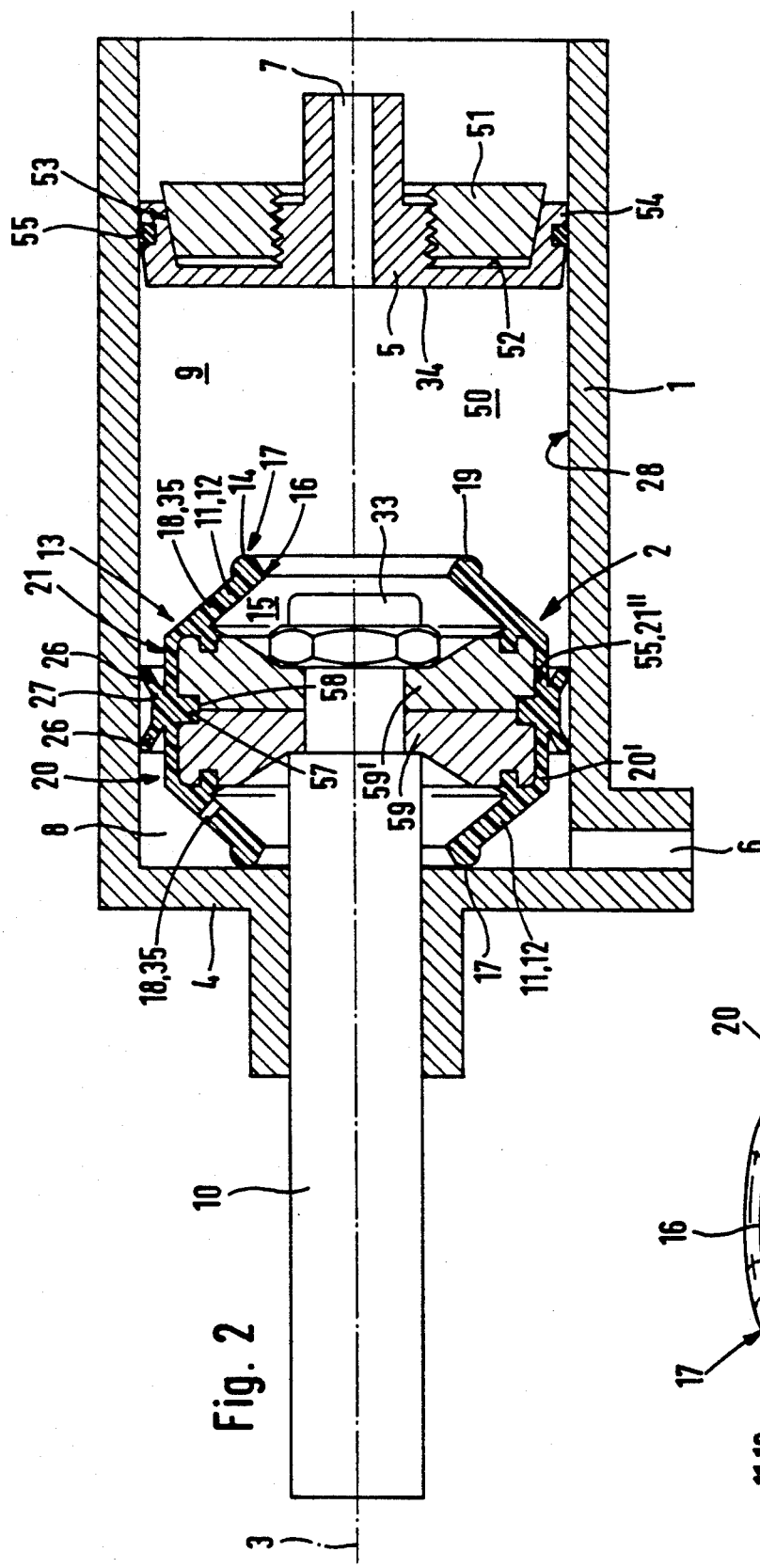
FIG. 2 shows a further working embodiment of the linear drive in accordance with the invention, again in longitudinal cross section diagrammatically.

The linear drive illustrated in FIG. 1 and 2 is designed in the form of a pneumatically operated piston and cylinder unit. It possesses a housing 1 constituting a cylinder, in which a drive member 2 designed in the form of a piston which reciprocates between two end positions in the axial direction. Each axial end side of the drive member 2 is opposite to a respective wall 4 or 5 which in the present case is constituted by the terminating wall of the housing 1 and may be designed as a removable cover. There are connection openings 6 and 7 which open at the two end sides into a respective one of the two working spaces 8 and 9 separated from each other in the housing 1 by the drive member 2. Via such openings known supply and/or removal of a fluid will lead to axial movement of the drive member 2. This fluid will preferably be compressed air. The movement of the drive member 2 may be exploited or utilized outside the housing 1, for which purpose a piston rod 10 connected with the drive member 2 is extended outwards through at least one of the walls 4 and 5. The drive member 2 might furthermore be designed without any piston rod, in which case the transmission of movement to the outside would have to be effected in some other way, for instance using cables or magnetic means. Furthermore the linear drive might be in the form of a so-called slotted cylinder.

When the end of the stroke is reached, that is to say in end positions or limits the drive member 2 abuts the respective wall 4 or 5. The linear drive is provided with means to reduce end position impact, which comprise an impact member 11. The latter is designed and arranged in special manner so that the movement of the drive member is retarded directly prior to reaching its end position effectively so that the impact is damped.

Dependent on whether the movement of the drive member 2 is to be damped only in one or in both of the two possible directions of movement, there is respectively one such impact member 11 for one or both of the working spaces 8 and 9. It may in this respect be arranged on the drive member 2 or on the associated wall 4 and 5 facing the respectively other component, that is to say the wall or the drive member. While in the case of FIG. 2 two impact members 11 are arranged on the opposite end sides of the drive member 2, FIG. 1 shows a design with both possible forms.

In all cases the impact member 11 consists of a circumferentially continuous annular lip 12, which is so arranged on the component 2; 4 and 5 bearing it that it projects towards the opposite component 4, 5; and 2. In this respect it is preferred to have an annular lip which extends both axially and also radially, both its inner also its outer form being preferably frusto-conical in design. In this respect the axial side 13 with the larger diameter faces the supporting component and the axial side 14 with the smaller diameter is turned towards the spaced, opposite component.

In the mounted or fitted condition, to which the following description relates, the annular lip 12, which is designed to be elastically bent, defines a damping space 15, which is open to the opposite component via the annular opening 16. The open side of the annular opening 16 is in what follows to be referred to as the impact side 17, because between it and the opposite component there is an impact on approaching the end position. The position at the instant of impact is illustrated in FIG. 2 with respect to the impact member 11 associated with the left working space 8.

At the instant of impact the annular opening 16 is preferably sealed off and occluded by the facing component. If the annular lip is arranged on the drive member 2, the occluding component is constituted by the associated wall 4 and 5 or if not by the drive member 2.

On contact of the annular lip 12 with the component occluding the annular opening 16 the part of the stroke with a braking action begins, in the course of which the annular lip 12 is bent over inwards along its entire annular periphery with the movement towards of the drive member 2 and the associated wall 4 and 5. When such bending takes place a volume of fluid trapped previously by the occluding component is compressed in the damping space, since the volume of the damping space 15 is diminished. The bent in condition is illustrated in the lower half of FIG. 1 with the impact member 11 mounted on the drive member 2.

In order to prevent any rebound of the drive member 22, the damping space 15 is connected, at least in the non-occluded condition of the annular opening 16, with an escape opening 18, through which fluid may escape from the damping space 15 subject to a choking action. When the end position is reached, preferably so much fluid will have escaped from the damping space 15 that the internal pressure in the damping space 15 will have gone down to such a level that even on discontinuance of the pressure displacing the drive member 2 there is no corresponding opposite return movement.

The retardation of the drive member is therefore based on fluid damping, the kinetic energy being absorbed in the shortest possible path. The retarding or braking action for a given load condition may be adjusted without any problems by varying the cross section of the escape opening or the selection of a different number of escape openings.

A circumferential sealing bead 19 molded on the impact side 17 of the annular lip 12 may reduce wear due to impacts and may permanently ensure a sealing contact during the time in which one component is performing a occluding function.

It is preferred for the annular lip 12 to be part of a skirted or cuff-like elastic member 20, which preferably completely consists of rubber-elastic material. A preferred design, as shown in FIG. 1 as mounted on the drive member 2, is separately illustrated in FIG. 3. Starting at the impact side 17 there is firstly the axially adjoining annular lip 12 with the conically widening inner and outer surfaces, after which there is an integrally molded holding section 21, which terminates the elastic member at its axial holding side 22. With this holding side 22 to the fore the elastic member 20 is carried and fixed on the respective drive member 2 by the intermediary of the holding section 21. In this respect it is an advantage if the holding section 21, as in the working embodiment, is part of a snap-action connection device 23, by means of which the elastic member 20 and consequently the annular lip 12 is fixed on the drive member 2. This facilitates the assembly and any later replacement due to wear.

In the working embodiment the elastic member 20 is clipped or snap-fitted onto the outer periphery of the drive member 2 with the holding section 21 to the fore. For this purpose it is expedient for the wall of the elastic member 20 in this part to have a configuration which is substantially cylindrically tubular. Furthermore it is expedient for at least one annular circumferentially extending projection to be present belonging to the snap-action connection device 23, such projection extending radially inward and fitting into a complementary holding groove of the drive member 2 with a securing action. A further annular projection 25 arranged within the annular opening 16 in the part between the holding section 21 and the annular lip 12 may fit from the axial side, facing the annular lip 12 into an end annular groove in the drive member 2 in order as well to have a fixing action.

Adjacent of the outer periphery of the drive member 2 there is in the working embodiments a circumferentially extending sealing lip 26, which is a component of a piston seal 27 and provides a sealing action between the drive member 2 and the inner surface 28 of the housing. It is preferred for this sealing lip 26 and more particularly the entire piston seal 27 to constitute an integral part of the elastic member 20, something that cuts down the number of components of the linear drive. The sealing lip 26 is preferably arranged on the holding side 22.

The annular lip 12 may be a component of a member which, with the exception of the impact side 17, is completely shut off, and more particularly of an elastic member resembling a container provided with a floor or bottom. In the case of the preferred design however the respective component 2; 4 and 5 bearing the annular lip 12 is a component of the limiting wall of the damping space 14 so that there is an economy of material.

If the annular lip 12 is provided on a wall 4, as shown in FIG. 1 on the left hand half thereof, it is then expedient for attachment to be ensured in a corresponding manner, in which respect however the holding section 21 and 21' is adapted to suit the respective features of the design. In the working embodiment the corresponding holding section 21 and 21' is constituted by a bead, which is releasably snapped into a complementary annular recess 32 in the end side of the wall. In other respects the impact member 11 may be designed as in the cases described in the above.

In all cases it is expedient for the annular lip 12 and any elastic member 20 present to be arranged coaxially in relation to the drive member 2. In this manner it is possible, as in FIG. 1 with the annular lip 12 locked on the wall, for any piston rod 10 present to extend axially through the annular opening 16 leaving a annular radial gap.

In order to exactly predetermine an end position it is convenient to provide an end abutment 33 connected with the drive member 2 so as to move therewith, such abutment running sharply up against a counter abutment 34, which is integral with the housing, when the end position is reached. When the end abutment 33 meets with the counter abutment 34 the retarding action is terminated in this case. The end abutment 33 is preferably arranged on the same end side of the drive member 2 as the associated annular lip 12 within the annular opening 16. It preferably extends from the drive member 2 some distance into the damping space 15. The transverse dimensions are so selected that between its outer periphery and the inwardly bent annular lip 12 there is an annular gap 35 as shown in FIG. 1. The counter abutment 34 may be directly constituted by the facing housing wall 4 or 5. Therefore when the end position is reached both the impact side 17 of the annular lip 12 and furthermore the end abutment 33 will rest on the associated wall 4 and 5. Unlike cases in which the annular lip 12, which is bent inwards or bent over, itself constitutes the end abutment (in the case of FIGS. 1 and 2 this respectively applies for the impact members 11 associated with the left working space 8) the design with a separate end abutment is characterized by a particularly low degree of wear.

The escape opening 18 into the damping space 15 is preferably constituted by an interruption 35 in the annular lip 12. In this respect it may be a question of a capillary duct. A plurality of escape openings 18 are possible for each damping space 15.

The escape opening might furthermore be constituted by surface roughness on the impact side 17 of the annular lip 12, which in the occluded condition of the annular opening 16 causes a certain leaking effect where contact is made. In lieu of this it would furthermore be possible to provide at least one groove in the edge of the annular lip 12, which groove would constitute the escape opening in the occluded condition.

As an alternative to the above noted possibilities the escape opening 18 might furthermore be provided on the drive member 2 itself or on the respectively associated according to 4 and 5. The latter design possibility is to be seen on the right in FIG. 1. Here the escape opening 18 and 18' on the one hand on the wall 5 is so directed into the associated working space 9 that the lumen 31 thereof—as seen in the axial direction—may at any time take up a position within the annular opening 16 adjacent to the impact side 17. The other end of the escape opening 18 is in this case preferably returned into the associated connection opening 7, which during the action of the associated impact member 11 is generally pressure-less or at least has a lower pressure than the pressure exerted by the compressed fluid in the pressure space. It is furthermore possible to connect the escape opening 18 and 18' with another means for receiving spent fluid. The illustrated working embodiment offers the advantage that in the case of supply of fluid via the connection opening 7 the damping space as well receives fluid via the parallel escape opening 18 and 18', something improving response behavior. The escape opening 18 and 18' as shown in broken lines may naturally also be arranged within the wall of the housing.

As shown in FIG. 1, it is possible to have a choke 36 in the escape opening 18. For the adjustment as desired of the choking effect the choke may be of an adjustable design, for instance in the form of a screw-type choke.

On coming into contact with the component 2; 4 and 5 occluding it, the annular lip 12 is preferentially acted upon at its edge associated with the impact side 17. During the ensuing inward bending this edge is bent back axially, the inner diameter of the annular opening 16 possibly being reduced as well adjacent to the impact side 17. In some cases the annular lip 12 is furthermore invaginated or tucked axially inwards in its section associated with the impact side 7.

Such linear drives are frequently operated with a stroke of the drive member 2 which is less than the maximum possible stroke. The reversal of the direction of movement may in this case be for instance caused using proximity switches 37, which are actuated without making contact by a magnetic means 38 arranged on the drive member 2. In order to ensure, despite different stroke parameters, that the damping in accordance with the invention is effective, it is possible for the drive member 2—as illustrated in FIG. 1 for instance—to have two mutually axially adjustable drive elements 39 and 39' which are able to be set to different axial distances in relation to each other. This means that it is possible to vary the axially measured breadth of the drive member 2 so that the overall stroke moved by the drive member 22 between the two end positions may be varied. In other respects the manner of operation of the impact damping system is the same as above noted. The impact members are respectively arranged on one of the walls 4 and 5 or on the facing drive element 39 and 39' in order when approaching the respective end position to cooperate with the respectively opposite component.

In order in this respect to render possible an adjustment of the stroke from the outside, the piston rod consists of an outer tube 42 bearing the drive element 39 and within which an adjustment rod 43 is arranged so that it may be shifted axially, which rod bears the second drive element 39 on the section projecting from the outer tube in the housing. It is preferred for the adjustment rod 43 to be able to be axially screwed using a screw thread 44 within the outer tube 42, it being possible for a screw driver or wrench to be inserted through the opening 45 in the outer tube 42.

As an alternative to the adjustable drive elements it is furthermore possible to design at least one of the two walls 4 and 5 so as to be axially adjustable in relation to the housing 1 and to be able to be locked in different axial settings. One working embodiment in this respect is provided by FIG. 2 with respect to the right housing wall 5. This housing wall 5 simultaneously constitutes furthermore the counter abutment 34 of the end abutment 33 of the drive member 2. The illustrated preferred working embodiment provides that the wall 5 is set in the inner space 50, accommodating the drive member 2, of the housing 1 so that the wall—guided by the inner surface 28 of the housing—may be adjusted in the axial direction 3. The inner surface 28 of the housing therefore constitutes simultaneously a guide and sealing surface both in relation to the drive member 2 and also for the shifting wall 5. For adjustment of the stroke the wall 5 is moved into the desired axial position in which it is releasably fixed by clamping it in relation to the housing 1. Such clamping is performed in the illustrated working embodiment by having a radially outward conical clamping ring 51, which is able to be axially screwed from the outside into a recess 52 in the wall 5, its frusto-conical radially outer wall surface 53 causing a radial expansion of an outer ring or annular section 54 of the wall. It is in this manner that a large range of axial adjustment is provided for without the inner surface 28 of the housing being affected, for instance by the necessity of having screw threads. Between the annular section 54 and the housing 1 it is preferred to provide a sealing arrangement 55 as well.

It is preferred for the inner space 50 to be open on one axial side so that the adjustable wall 5 may be inserted and is accessible at any time. The adjoining opening 7 associated with this end side is preferably provided on the adjustable housing wall 5 so that it is moved when the same is adjusted.

As above noted in the case of the working embodiment illustrated in FIG. 2 there is provision for end damping for both directions of movement, for which reason there are two annular 12 lips performing the function of the impact member, such lips being furthermore both arranged on the drive member 2. On each axial side of the drive member 2 there is therefore such an annular lip 12, which—as seen in the longitudinal section of FIG. 2—has a form running obliquely inwards towards the respectively axially opposite wall 4 and 5 in order to surround the annular opening 16 at the impact side 17 which is axially spaced from the drive member 2. Because in the case of the linear drive in accordance with FIG. 2 it is a question of a fluid power driven unit—the drive member 2 being driven by a piston—a piston seal 27 extends around the drive member 2 radially outside it and which preferably has two sealing lips 26 extending in opposite directions.

The piston seal 27 is secured to the drive member 2.

An advantage of the working embodiment in accordance with FIG. 2 is that both annular lips 12 are components of an integral, cuff-like body 20', which preferably is designed in the form of an elastic member. The piston seal 27 also preferably constitutes a part of this integral body 20', as shown in FIG. 2. A central part 55 of the this cuff-like body 20' consequently surrounds the outer surface of the drive member 2, such central part being adjoined on both sides by respectively one of the annular lips 12. The two sealing lips 26 are molded on the central part 55. Furthermore the central part 55 performs the function of a holding section 21'' by means of which the body 20' is secured to the drive member 2.

For attachment the central section 55 bears a radially inner, integrally molded annular projection 57, which fits into a complementary holding groove 58 in the outer surface of the drive member 2. In order to facilitate assembly it may be expedient to radially divide the drive member 2 adjacent to the holding groove 58 so that as illustrated two axially adjacent drive elements 59 and 59' are formed, which for instance may be held together by means of a screw.

Figure 3:
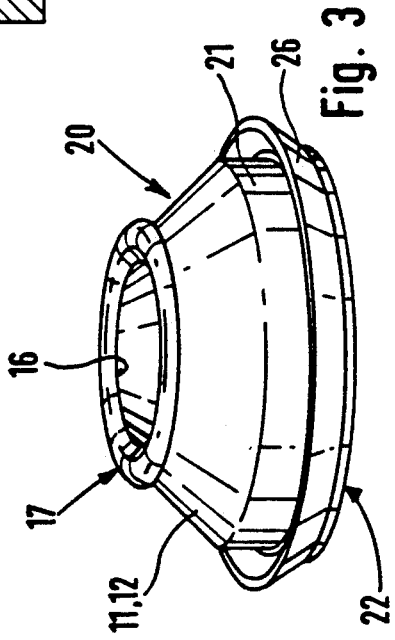
FIG. 3 shows an impact member designed in the form of a cuff-like elastic member as seen in perspective.

It is possible therefore for the cuff-like member 20' as illustrated in FIG. 2 to be conceived of as a component, which consists of two elastic members 20 connected together at their holding side 22 integrally with each other and of the type illustrated in FIG. 3.

It is furthermore to be pointed out this the two-part, adjustable working embodiment of the drive member illustrated in FIG. 1 and furthermore the adjustability of one housing wall 5 described with reference to FIG. 2, may also be utilized in the case of linear drives, which have other means for reducing end-of-stroke impact than the means described herein.

If the annular lips 12 and the seal lips 26 or, respectively, the piston seal 27, are made integrally with each other, there will be a cuff-like body 20 and 20', which may be simply produced and assembled so that the design is generally extremely favorable in price.

We claim:

1. A linear drive comprising:
   a drive member which reciprocates axially, between two end positions in a housing by means of a driving fluid,
   a wall connected to said housing, opposite to at least one axial end of said drive member,
   means for reducing the impact between said wall and said drive member in a corresponding end position of said two end positions,
   said means comprising an impact member alternatively attached either to said drive member or to said wall so as to axially face a corresponding said wall or said drive member,
   said impact member having an annular elastically flexing lip projecting therefrom toward said corresponding said wall or said drive member,
   said annular lip defining an opening on an impact side which impacts with said corresponding said wall or said drive member,
   said impact member upon approaching said corresponding end position reaching a damping position in which said annular lip is in contact with said corresponding said wall or said drive member which covers said opening,
   said impact member having damping space means for defining a damping space within said housing in a housing space between said drive member and said wall,
   said housing space communicating with a connection opening for supply or removal of said driving fluid,
   a choked escape opening communicating with said damping space means permitting a choked escape of fluid from an interior of said damping space means at least in said damping position of said impact member.
   wherein said damping space means comprises an interior of said impact member, said interior being open to said housing space through said opening in positions other than said damping position and being covered by said corresponding said wall or drive member in said damping position at least until reaching of a corresponding said end position,
   wherein in said damping position a volume of driving fluid is trapped in said damping space means within said interior of said impact member, and fluid of said trapped volume of driving fluid being urged to escape through said escape opening upon reduction of a volume of said damping space caused by said annular lip being flexed upon further approaching to said corresponding end position by said drive member.

2. The linear drive as claimed in claim 1, wherein the annular lip has a frustoconical configuration, an axial side with a smaller diameter being located at said impact side.

3. The linear drive as claimed in claim 1, wherein the impact member is a cuff-like elastic member having rubber-like properties.

4. The linear drive as claimed in claim 1, wherein the annular lip is in sealing cooperation with said corresponding said wall and said drive member in said damping position.

5. The linear drive as claimed in claim 1, wherein the impact member has an annular holding section on a side opposite to said impact side, said holding section having connection means for attaching said impact member to either said drive member or said wall.

6. The linear drive as claimed in claim 5, wherein said holding section has a snap-action connecting device by means of which the annular lip is detachably connected with said drive member or said wall.

7. The linear drive as claimed in claim 1, wherein said drive member or said wall on which said impact member is attached constitutes a section of a limiting wall of said damping space.

8. The linear drive as claimed in claim 1, wherein said annular lip is arranged on said drive member and is integrally connected with a circumferential outwardly turned sealing lip, said sealing lip in sealing cooperation with an inner surface of said housing surrounding said drive member.

9. The linear drive as claimed in claim 1, wherein said annular lip is invaginated upon being flexed.

10. The linear drive as claimed in claim 1, wherein said escape opening is provided on said impact member.

11. The linear drive as claimed in claim 1, wherein said escape opening is formed on either said drive member or said wall connected with said housing.

12. The linear drive as claimed in claim 1, comprising a piston and cylinder unit, said member being a piston which is moved by fluid power.

13. The linear drive as claimed in claim 1, wherein said drive member comprises two drive elements having means thereon for adjusting a space along a longitudinal axis of and between said drive elements.

14. The linear drive as claimed in claim 1, at least one wall slideably engaged to said housing,
    said at least one wall having means for axially adjusting and locking said at least one wall in different axial positions of said housing.

15. The linear drive as claimed in claim 14, wherein, said at least one wall constitutes a counter abutment member cooperating with said drive member to predetermine an end position thereof.

16. The linear drive as claimed in claim 15, wherein said at least one wall has a housing cover which shuts off said housing space receiving said drive member.

17. The linear drive as claimed in claim 1, wherein one said annular lip is arranged on each axial end of said drive member, each said annular lip being part of an integral cuff-like impact member mounted on an outer surface of said drive member.

18. The linear drive as claimed in claim 17, wherein a portion between each said annular lip on said cuff-like impact member has at least one circumferential integrally molded sealing lip, which is turned radially outwards and is in sealing cooperation with an inner surface of said housing surrounding said drive member.

19. The linear drive as claimed in claim 10, wherein said escape opening has an interruption in said annular lip on said impact side thereof.

20. The linear drive as claimed in claim 1, wherein said escape opening comprises a surface roughness causing a leaking effect in a contact area between said annular lip an a corresponding said drive member or said wall.

* * * * *